United States Patent [19]

Lewiner et al.

[11] 4,441,134
[45] Apr. 3, 1984

[54] CIRCUIT BREAKERS SENSITIVE TO LEAKAGE CURRENTS

[76] Inventors: Jacques Lewiner, 5, rue Bory d'Arnex, 92210 Saint-Cloud; Didier Perino, 10, rue Bellevue, 92150 Suresnes; Claude Hennion, 18, rue Flatters, 75005 Paris, all of France

[21] Appl. No.: 359,494

[22] Filed: Mar. 18, 1982

[30] Foreign Application Priority Data

Mar. 18, 1981 [FR] France .................. 81 05451

[51] Int. Cl.³ .............................. H02H 3/28
[52] U.S. Cl. ............................ 361/45; 361/96
[58] Field of Search ................. 361/44–46, 361/73, 75, 96, 97

[56] References Cited

U.S. PATENT DOCUMENTS 3,801,872 4/1974 Zocholl et al. .................. 361/73
4,024,435 5/1977 Gross .................. 361/45
4,216,516 8/1980 Howell .................. 361/44 X
4,347,541 8/1982 Chen et al. .................. 361/97 X

*Primary Examiner*—Harry E. Moose, Jr.
*Attorney, Agent, or Firm*—Larson and Taylor

[57] ABSTRACT

The invention relates to a circuit breaker for cutting off the two AC supply leads of an electrical receiver from the time of creation of a leakage current F between said receiver and ground through a human body. This circuit breaker comprises a differential transformer generating a faulty voltage $V_O$, a relay with contacts open when it is not energized, and means ($A_1, A_2, \ldots A_n$; $R_1, R_2 \ldots R_n$) supplied by the system, adapted to exploit the voltage $V_O$ for the purposes of energizing the relay if the current F is dangerous or at least unpleasant in its intensity and/or its duration, without however being sensitive to disturbances.

11 Claims, 5 Drawing Figures

CIRCUIT BREAKERS SENSITIVE TO LEAKAGE CURRENTS

The present invention relates to circuit breakers or safety devices connected to the alternating current supply of an electrical receiver and intended to automatically cut off or "break the circuit" of this supply on the appearance of a leakage current between any point of said receiver and ground.

By the word "receiver" is meant above and below any circuit or electrical apparatus whose operation calls upon an alternating electric current supply, including supply leads for this circuit or apparatus.

In the preferred embodiments, the leakage current to be monitored corresponds to a portion of the supply current of the receiver, which portion, coming from the electrical supply source to the receiver flowing through one at least of the conductor wires of a supply cable, does not return to the source by flowing through said cable, but runs to ground through a human body unintentionally placed in contact with a bared conducting portion of the receiver concerned, which creates the risk of electrocution which is particularly serious in wet surroundings.

The invention is aimed more particularly, among circuit breakers of the type concerned, at those which comprise a differential transformer mounted on the supply wires of the receiver to be protected, which transformer is arranged so as to generate automatically, in a conductor wire independent of those of the cable, an electrical voltage $V_O$ when there is unbalance between the currents flowing in the wires of said cable, and means for exploiting said voltage $V_O$ so as to automatically open a switch connected to one at least of said wires as soon as the amplitude of the voltage $V_O$ exceeds at least a predetermined threshold.

It is a particular object of the invention to render circuit breakers of the type concerned such that they respond better to the various exigencies of practice than hitherto, particularly in that they ensure protection with a higher degree of safety, particularly by triggering both a very rapid breaking of the circuit on the creation of an intense leakage current and a less rapid breaking of the circuit, but still effective, on the creation of a leakage current of relatively low intensity, but unpleasantly felt by the human body traversed by this current if it is prolonged beyond a certain duration, and this whilst remaining practically insensitive to electrical disturbance.

To this end, circuit breakers of the type concerned, according to the invention, are essentially characterised by the combination of the three following features:

the above switch is constituted by the contact of a relay arranged so as to open as long as this relay is not supplied electrically, the exploitation means of the voltage $V_O$ are connected so as to be supplied by the source of electrical current on the connection of the receiver to the source, that is to say connected to the cable between this source and the switch, said exploitation means of the voltage $V_O$ are arranged so as to supply the relay electrically by the source or to permit this supply on normal connection of the receiver to this source, and to automatically cut off this supply as soon as there is creation, between the receiver and ground, of a dangerous leakage current or at least one which is unpleasant through its intensity and/or its duration. To achieve this object, the exploitation means of the voltage $V_O$ comprise a circuit of n amplifiers in series supplied by this voltage after its rectification if necessary, n being an integer higher than 1, a number n of delay circuits supplied respectively by the output voltages from n amplifiers, each delay circuit of the order i (i being an integer comprised between 1 and n, terminals included) being adapted to form, after each emission of a voltage signal $V_O$ starting at the moment $t_O$, a voltage pulse $U_i$ delayed by a time delay $t_i$ with respect to $t_O$, among these pulses only those being created which correspond to time delays $t_i$ less than the actual duration of the signal $V_O$, a member with n inputs and with one output receiving the pulses $U_i$ on the various inputs and adapted to emit a control signal at its output as soon as the amplitude of one of these pulses reaches or exceeds a predetermined threshold W and electronic means connected to said output and arranged so as to automatically cut off the supply of the relay as soon as there is emission of a control signal at said output.

In preferred embodiments, recourse is had in addition to one and/other of the following features considered separately or in combination:

resetting means are provided to unblock the electronic cutoff means after they have actuated the above cutoff, this unblocking having the effect of ensuring or permitting the electrical supply of the relay again, the resetting means are manually actuable, the resetting means are arranged so that they are actuated automatically after a first duration $d_1$ subsequent to each cutoff of the supply of the relay, this relay being then again supplied for a second duration $d_2$ which is relatively short, and at the end of this second duration $d_2$ the supply of the relay is maintained or again cut off according to the disappearance or the persistance at this moment of the faulty voltage $V_O$.

the resetting means according to the preceding paragraph comprise two monostable circuits in cascade, a flipflop circuit of type D connected to the output of the amplifier of order n and to the output of the second monostable circuit, and an OR gate connected to the output of the type D trigger circuit and to the output of the first monostable circuit, resetting means according to any one of the two preceding paragraphs are arranged so that the resetting and reblocking cycle of the electronic cutoff means is repeated at least once before resulting in final cutoff in the case of persistance of the faulty voltage $V_O$, the above durations $d_1$ and $d_2$ are respectively of the order of 100 ms and 30 ms, the delay $t_1$ is greater than the duration of the large amplitude initial portion of the electrical disturbance but less than the admissible maximum duration for leakage currents of high intensity, this delay being preferably of the order of 10 to 20 ms, the components of the circuit breaker are selected so that the amplitude of the pulse emerging from the amplifier of highest degree or rank reaches the threshold W only when the intensity of the leakage current exceeds the maximum value $I_M$ supportable in prolonged regime by a human body, the value of this intensity $I_M$ being preferably of the order of 1 mA, one at least of the delay circuits of order i higher than 1 comprises successively a branch circuit composed of a resistor and a capacitor in parallel with one another, a first inverter, a second resistor, a second capacitor branched on the output of the second resistor and a second inverter whose input is also connected to the output of the second resistor.

The invention comprises, apart from these main features, certain other features which are preferably used at the same time and which will be more explicitly considered below.

In the following, preferred embodiments of the invention will be described with reference to the accompanying drawings given of course purely by way of non-limiting example.

FIG. 1, of the drawings, is a general diagram of a circuit-breaker constructed according to the invention.

Figure 1:
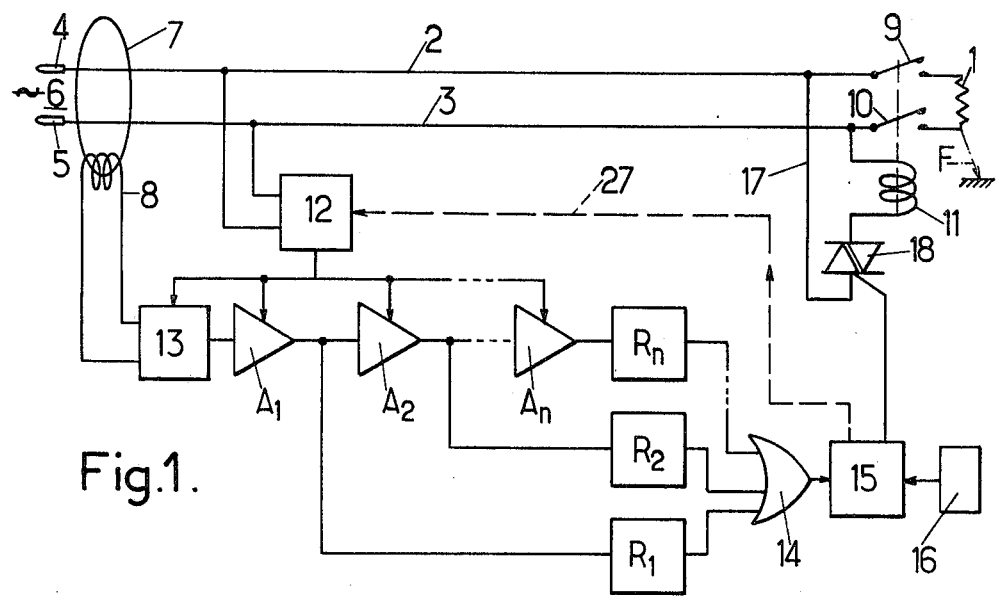

In the embodiment shown diagramatically in FIG. 1, the electrical receiver to be monitored, which is, for example, a hairdrier or an electric razor, comprises a load 1 and supply wires 2 and 3 assembled in a single cable.

The ends of these wires 2 and 3 most remote from the load 1 are connected to as many plugs 4 and 5 easily connectable to an AC supply system 6: were monophase current is concerned, these wire-plug assemblies are two in number, as illustrated, and correspond respectively to phase and to neutral. Where three-phase current is concerned, the wire-plug assemblies are three in number corresponding to the three phases, or four corresponding to three phases and to neutral.

The circuit breaker concerned is designed to cut off automatically one at least of the wires 2 and 3, and preferably all of these wires, as soon as a leakage current F dangerous in its intensity and/or its duration is established between the load 1 and ground, particularly through a human body.

This circuit breaker comprises here:
a differential transformer 7 mounted on the two wires 2 and 3 arranged so as to generate automatically in another wire 8 an alternating voltage $V_O$ when there is unbalance between the currents flowing in the two wires 2 and 3, and means for utilizing the voltage $V_O$ so as to automatically open two switches 9 and 10 mounted respectively in wires 2 and 3 as soon as, after a predetermined minimum delay, $V_O$ reaches a predetermined threshold W and/or as soon as the duration of this voltage $V_O$ reaches a predetermined threshold, if of course its amplitude exceeds itself a predetermined minimum.

The switches 9 and 10 are constituted by the contacts of a relay 11 constructed so as to open as long as this relay is not supplied electrically.

Besides, the means for utilizing the voltage $V_O$ generated in the wire 8 are mounted so as to be supplied by the mains system 6 as soon as the receiver 1 is connected to this mains the circuit 12 which generates the continuous supply voltage of said exploitation means is hence connected to the two wires 2 and 3 between the plugs 4 and 5 of these wires and the switches 9 and 10.

Finally, said exploitation means for the voltage $V_O$ are arranged so as to supply the relay 11 electrically through the mains network or to permit this supply on "normal" connecting up of the receiver, that is to say in the absence of a leakage current F, and to cut off automatically the supply of said relay 11 from the mains network on creation of such a leakage current F considered as dangerous or at least unpleasant through its intensity and/or its duration.

In other words, the means concerned are arranged so as to actuate said cutoff:
almost instantaneously, namely in a period less than 20 ms or even than 10 ms when the leakage current is very intense, its intensity reaching, or exceeding, for example 200 or 500 mA, with an all the greater delay, consecutive to the beginning of the establishment of the leakage current F, as the intensity of this current is lower, and after a relatively long maximum delay, being able to reach or even exceed 50 ms if the leakage current concerned is prolonged over the whole extent of such a delay and has an intensity exceeding the threshold considered as unpleasant for a human being, which threshold, is, for example, of the order of 1 mA.

To this end, the exploitation means concerned comprise:
a threshold-less rectifying system 13 to which the wire 8 is connected, a chain of amplifiers in series $A_1, A_2 \ldots A_n$, n being an integer higher than 1, n time delay circuits $R_1, R_2 \ldots R_n$ each connected to the output of an amplifier $A_1, A_2, \ldots A_n$, an OR gate 14 with multiple inputs receiving the various outputs from the delay circuits $R_1, R_2, \ldots R_n$ and adapted to be triggered as soon as the amplitude of the voltage applied to any one of its inputs reaches the predetermined threshold W, a flip-flop circuit 15 of which one of the two inputs is connected to the output of the gate 14, a resetting circuit 16 of which the output is connected to the second input of the flip-flop circuit 15, a circuit 17 ensuring the electrical supply of the relay 11 from the network 6 and connected for this purpose to the two wires 2 and 3 at the places explained below, and an electronic switch 18 such as a controlled rectifier or similar mounted in the circuit 17, the control electrode of this switch being connected to the output of the flipflop circuit 15.

Each of the time delay circuit $R_i$ (i being an index comprised between 1 and n, terminals included) is arranged so as to form a voltage pulse $U_i$ of amplitude $V_i$ with a time delay $t_i$ later than the moment $t_O$ corresponding to the start of the emission of each faulty voltage $V_O$ in the wire 8.

The values of these time delays $t_i$ increase with the index i.

The first time delay $t_1$ is greater than the duration of the large amplitude transient initial portion of the electrical disturbance, but less than the admissible maximum duration for high intensity leakage currents F, namely for values of this intensity higher than or equal to 200 mA: this time delay is preferably of the order of 10 to 20 ms.

The last time delay $t_n$ is relatively long: its value can reach or even exceed 50 ms. The pulses $U_n$ emitted at the end of the time delay $t_n$ are only suitable for triggering the gate 14 if their amplitude reaches the threshold W: this is only the case if the intensity of the corresponding leakage current F, relatively prolonged, exceeds the threshold considered as unpleasant when it passes through the human body, this threshold generally being of the order of a milliampere.

The general operation of the circuit breaker described above is as follows.

Normally, that is to say in the general case when no leakage current is generated, the plugging in of the receiver 1 into the mains 6 is manifested immediately by the electrical supply of the relay 11 through the circuit 17 and hence by the placing of said receiver 1 in service.

The currents which flow in the two wires 2 and 3 being balanced, no differential voltage is induced in the wire 8 and the whole of the exploitation means adapted to block the member 18 remains inactive.

From the creation of a leakage current F, an unbalance is established between the currents flowing in the two wires 2 and 3, which induces a fault voltage $V_O$ in the wire 8.

Several cases can then occur:
if the amplitude of this voltage $V_O$ is sufficiently high, the amplitude of the pulse $U_1$ emerging from the assembly composed by the first amplifier $A_1$ and by the circuit $R_1$ reaches or exceeds the threshold value W, so that the gate 14 is triggered after the time delay $t_1$; this triggering is manifested by the actuation of the flip-flop 15, which has the effect of blocking the member 18 and hence of cutting off the supply of the relay 11 which immediately opens the switches 9 and 10: the response of this chain of components is sufficiently rapid to interrupt the leakage current F before damage is caused;
if the intensity of the leakage current F is less than the threshold $I_M$, beyond which its existence is manifested by an unpleasant sensation in the human body traversed by it, the monitoring chain does not react and the receiver 1 remains supplied;
if this threshold $I_M$ is exceeded slightly by the leakage current F, but for a prolonged period exceeding the above time delay $t_n$, the pulse $U_n$ emerging from the time delay circuit $R_n$ has an amplitude W sufficient to trigger the gate 14 to ensure the above-described cut-off of the supply of the receiver 1;
if the amplitude of the leakage current F is intermediate between those capable of triggering the gate 14 through respectively the channel of index 1 and the channel of index n, this current is manifested by a triggering of said gate after an intermediate time delay $t_i$ comprised beteen the two time delays $t_1$ and $t_n$, through the corresponding time delay circuit $R_i$.

The protection thus ensured through the above circuit breaker is particularly complete since it takes into account both the intensity and the duration of a leakage current and however, as will be explained below, it is not however actuated by single electrical disturbances appearing in the electric current delivered by the mains network, of which disturbances the initial transient portion, of high amplitude, does not generally last more than some milliseconds.

The circuits $R_i$ may be composed very simply by a resistor connected to the output of the corresponding amplifier $A_i$ and by a capacitor branched beteen the output of this resistor and the ground or a constant potential: the values of this resistor and of this capacitor are selected according to the time delay $t_i$ to be established between the input and the output of the circuit $R_i$ concerned.

Figure 2:
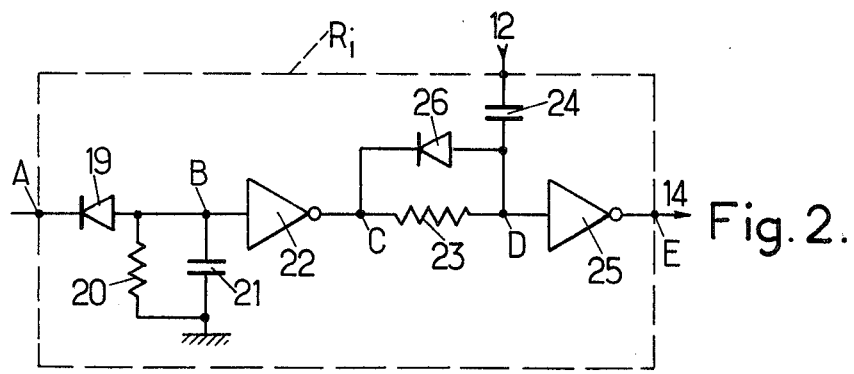
FIG. 2 shows in more detail the constitution of one of the subassemblies comprised by this circuit-breaker.

Another advantageous embodiment of such a circuit $R_i$ is shown diagrammatically in FIG. 2.

This circuit comprises the series of the following components:
a diode 19,
branched between the output of the diode 19 and ground, the assembly of a resistor 20 and a capacitor 21 mounted in parallel with one another,
a first inverter 22,
a resistor 23,
a capacitor 24 branched between the output of the resistor 23 and a constant potential formed by the above circuit 12 and of amplitude, for example, equal to $-W$,
and a second inverter 25.

Finally, a diode 26 in the same sense as the diode 29 is mounted in parallel with the resistor 23.

Figure 3:
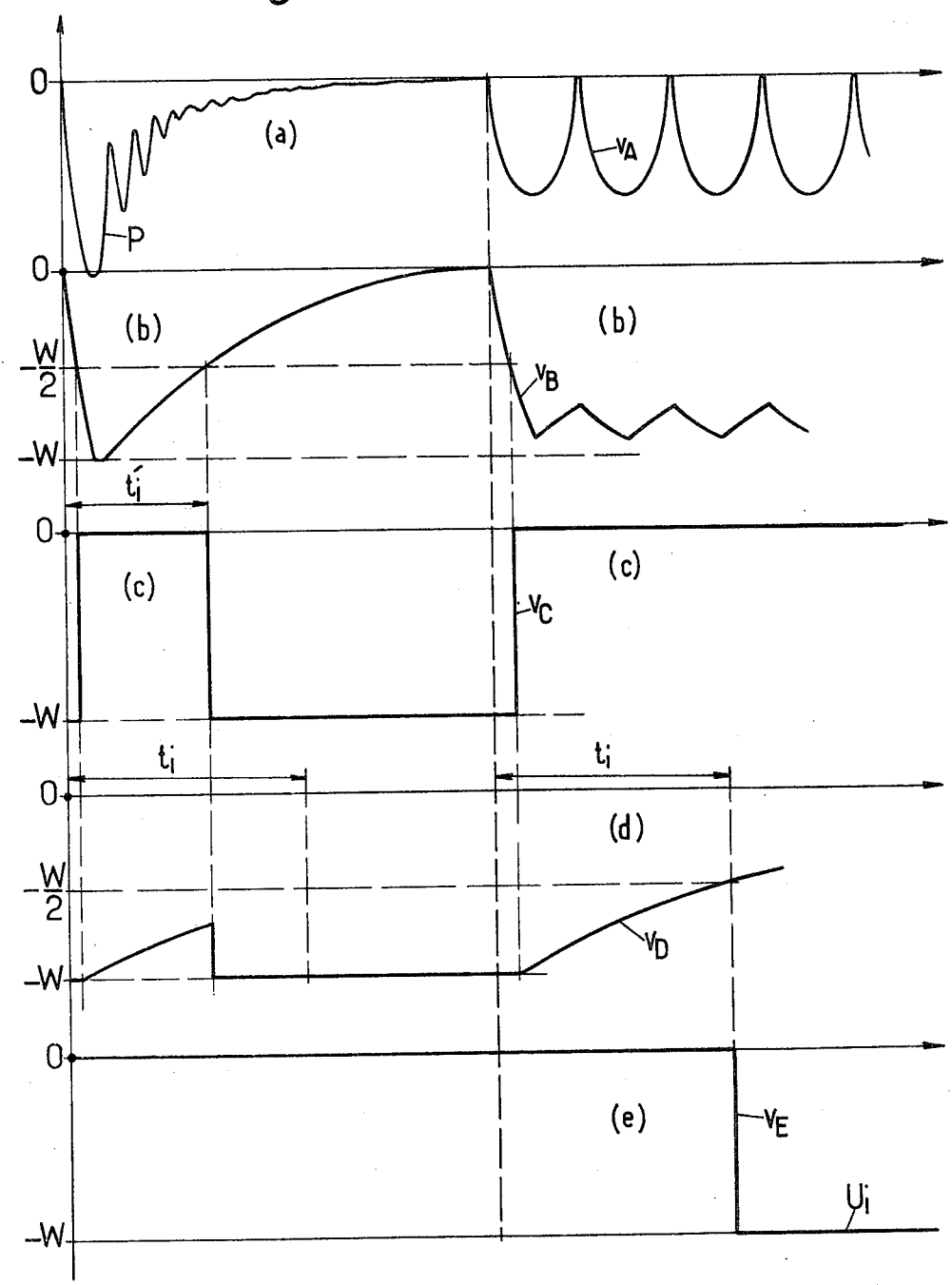
FIG. 3 shows a succession of graphs enabling the operation of the circuit-breaker to be explained.

The form of the voltages developed at different points of this circuit $R_i$ is represented in the various graphs of FIG. 3, according to the time plotted as abscissae: the graphs a, b, c, d and e relate respectively to the input A of the circuit $R_i$, the input B of the inverter 22, the output C of the inverter 22, the input D of the inverter 25, and the output E of this inverter 25 and of the circuit $R_i$.

There will first be studied, with reference to the right-hand halves of these graphs, the forms of the voltages created at the points A to E by an alternating voltage $V_O$ indicating the creation of a leakage current F and generated in the wire 8.

This voltage $V_O$ produces at A, after at least the passage through the rectifying system 13, a rectified wave voltage $V_A$ composed of contiguous half-waves of the same sign.

At B, the voltage $V_B$ resulting from the succession of charges and discharges generated at the terminals of the capacitor 21 has the form of a sequence of saw-teeth spaced from the nil ordinate, the potential corresponding to this sequence remaining constantly less than a predetermined threshold which may be considered as equal to $-W/2$.

As soon as this voltage B reaches, by increasing or decreasing from the zero value, the threshold concerned, the invertor 22 changes state and its output $V_C$ passes here from $-W$ to zero.

From this moment, the condenser 24 is gradually charged through the resistor 23 with which it forms an integrator circuit: this charge corresponds to the voltage $V_D$. At the end of the time $t_i$ depending on the values of these two components 23 and 24, the inverter 25 changes state in turn so that its output $v_E$ passes from zero to $-W$: it is here the signal $U_i$ whose value is sufficient to trigger the gate 14.

The same graphs of FIG. 3, considered in their left hand halves, enable the reason to be understood for which the circuit breaker according to the invention remains insensitive to electrical disturbances whose initial transient portions have high amplitudes but: short durations.

Such a disturbance after its rectification by the circuit 13 is shown at P in the graph a.

At the start of the manifestation of such a disturbance P, the voltage at point B certainly becomes less than the threshold $-W/2$, as is seen in graph b, but the values of the resistors 20 and 23 and of the capacitors 21 and 24 are selected so that said voltage at point B does not remain sufficiently long less than $-W/2$, and the output C passes again therefore to the potential $-W$ at the end of a relatively short time $t'_i$ (see graphs b, c and d), less than the time delay $t_i$: the increase or decrease in the voltage $v_D$ does not then last sufficiently long for this voltage to be able to reach the threshold value $-W/2$ and hence to change the state of the inverter 25: no signal is therefore generated at the output E and the gate 14 is not triggered.

The diode 26 is for the purpose of discharging the capacitor instantaneously as soon as the voltage at the point C comes back equal to $-W$: so that two electrical disturbances taking place one after the other with a relatively short time separation, namely less than $t_i$, are not "seen" by the integrator 23-24 as a single prolonged signal whose duration could exceed $t_i$ and hence trigger the gate, but as two distinct signals between which the unit is reset to zero.

In other words, the circuit concerned enables a "sorting" of the signals applied to it to be carried out, only those whose time constant is greater than that determined by the components 23 and 24 being able to give rise to the emission of an output signal $U_i$.

The various other circuits or sub-units $A_i$ and 12 to 16 may be constituted in any desirable way.

The resetting circuit 16 may be arranged so as to be actuated manually, that is to say by means of a voluntary and conscious intervention of the user of the receiver 1.

It can also be designed so that the resetting requires replacement of a fuse, which would be in particular included by the circuit 12 for forming the continuous supply voltages: this is what has been shown diagrammatically by the arrow 27 in FIG. 1, the circuit 12 then being connected to the second output of the flip-flop circuit 15 so that the fuse concerned is cut off when the flip-flop circuit 15 passes from its state corresponding to the conduction of the electronic switch 18 to its opposite state.

A particularly advantageous embodiment will now be described which enables all the sensitivity of the circuit breaker to be preserved without however the latter being finally triggable by the simple appearance of relatively long electrical disturbances in the supply current of the relay.

It must be avoided, in fact, for such disrturbances being able to finally cut the circuit of this relay as they do not present a danger for the user and the repetition of drawbacks due to such cutoffs (the need after each cutoff of manual resetting or even of fuse replacement) resulting in the long term of inducing the user to renounce the protection to the presence itself of the circuit breaker.

To this end, the resetting means are arranged so that they are automatically actuated at the end of a first period $d_1$ subsequent to each cutoff, this resetting being automatically followed, after a second period $d_2$, by a further cutoff if, and only if, a fault persists at this moment.

Experience shows that, if the first duration $d_1$ is of the order of 100 ms, any trace of the initial fault at the moment concerned is no longer observed—after a duration $d_1+d_2$ from the initial cutoff—if this fault was even a relatively long disturbance.

If on the other hand the fault concerned corresponds indeed to a leakage current, this fault persists at the moment concerned and the supply of the relay is again cut off at this moment.

This further cutoff can be final or on the other hand followed by one or several resetting-blocking cycles identical with that described above, which cycles enable checking with several repetitions of the possible persistence of the initially detected fault.

Figure 4:
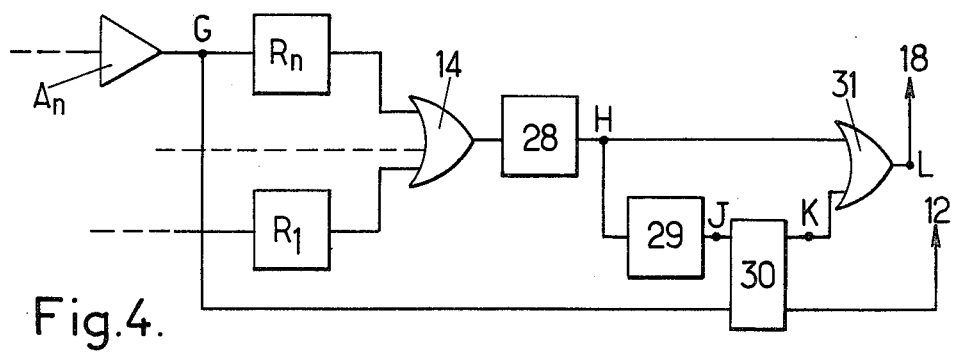
FIG. 4 is the diagram of an interesting modification, constructed according to the invention, of a portion of the above circuit-breaker.
Figure 5:
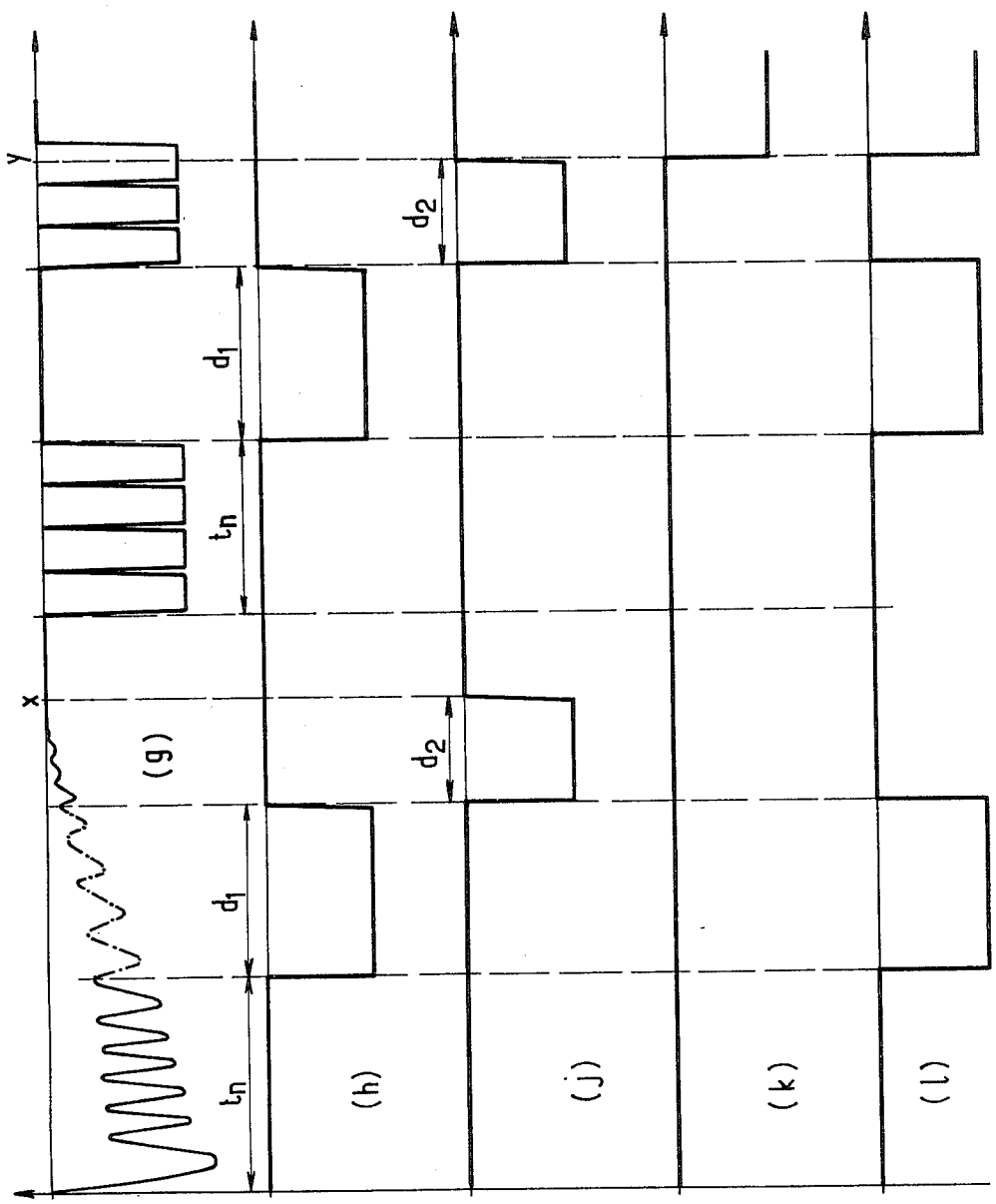
FIG. 5 shows a succession of graphs enabling the operation of this modification to be explained.

In the embodiment of FIGS. 4 and 5, it is the first hypothesis which has been retained.

In this embodiment, the resetting means comprise:

a first monostable circuit 28 of duration $d_1$ supplied by the output of the OR gate 14, a second monostable circuit 29 of duration $d_2$ supplied by the output of the first monostable circuit 28, a flip-fop circuit 30 of type D whose clock input is supplied by the output of the second monostable circuit 29 and whose other input is connected to the output of the amplifier $A_n$, and an OR gate 31 whose two inputs are connected respectively to the output of the first monostable circuit 28 and to one of the outputs of the flip-flop circuit 30.

The form of the voltages developed at the various points of this circuit is shown in the different graphs of FIG. 5, as a function of time plotted as abscissae: the graphs g, h, j, k and l relate respectively to the outputs g of the amplifier $A_n$, H of the first monostable circuit 28, J of the second monostable circuit 29, K of the flip-flop circuit 30 and L of the gate 31.

It will be noted that the graphs a of FIG. 3 and g of FIG. 5 are similar.

The lefthand part of each graph relates to the hypothesis of a relatively long disturbance and the right hand part, that of a true leakage current.

In each case, the existence of a relatively high voltage at the output G after a time $t_n$ later than the start of the manifestation of a voltage signal $V_O$ is translated by the actuation of the first monostable circuit 28, which has the effect of cutting off the supply of the relay 11 by opening the switch 18, and this during the period $d_1$.

At the end of this period $d_1$, the return of the first monostable circuit 28 into its initial position has the double effect, at the same moment, of again supplying the relay 11 by closing of the switch 18 and of actuating the second monostable circuit 29.

It is at the end of the second period $d_2$, consecutive at this moment to the actuation of the second monostable circuit 29, that the development of the resetting differs according to the fault which was at the origin of the initial circuit breaking was a relatively long disturbance or a leakage current.

In the first case, as can be seen at moment x in FIG. 5, the error voltage present at the point G has become insufficient to renew the circuit breaking so that the relay 11 remains supplied.

In the second case, as seen at the moment y in FIG. 5, the error voltage present at the point G remains insufficient for its transfer to the output of the type D flip-flop circuit 30 to again open the switch and hence finally cut the relay 11.

To avoid the moment of said transfer from corresponding exactly to one of the intervals comprised between two successive half waves of the voltage at point G, a sufficient value is given to the time of rebuilding the voltage pulse appearing at point K. In any case, the intervals concerned are very brief considering that as soon as the voltage $V_O$ reaches a value corresponding to a dangerous leakage current, the chain of amplifiers $A_1$ to $A_n$ is saturated and transforms the half waves that it receives into contiguous almost rectangular signals.

In order that the above final cutoff should not be neutralized too easily by the user, it may be advantageous to actuate at the same time as the latter the destruction of a fuse: in the latter hypothesis, the above circuit 12 or any other circuit including such a fuse is advantageously connected to the second output of the type D flip-flop circuit 30, as has been shown diagrammatically in FIG. 4.

The whole of the components bearing the references 7 to 27 can be miniaturized, or even constituted at least in part by means of integrated circuits, so that all can be housed in the relatively nonbulky housing of a movable electrical plug.

In the case where all of the electronic components of the circuit breaker and particularly those constituting the automatic resetting circuit would be integrated into a single miniaturised circuit, it could be advantageous to constitute the monostable circuits and delay circuits by pulse counters, all synchronized by the same clock.

The assembly of logic circuits of the circuit breaker can be constituted by a microcomputer.

Consequently whatever and however the embodiment adopted, there is finally provided a circuit breaker whose constitution and operation emerge sufficiently from the foregoing.

This circuit breaker has numerous advantages over those previously known, particularly the following:
- it ensures effective protection at the same time with respect to leakage currents of dangerous intensity, by a response which is then rapid, and with respect to less intense leakage currents, the response being all the slower as the leakage current is less intense, the circuit breaking being even ensured by leakage currents which are nondangerous, but prolonged and unpleasant,
- the circuit breaker remains insensitive to intense and brief (or even long in a preferred embodiment) electrical disturbances,
- it also ensures protection of the receiver 1 in the case of cutoff of one of its supply wires 2 and 3 and/or in the case of failure of the electronic means 7 to 27, in view of the impossibility of then applying the mains voltage to this receiver, in consequence of the adoption for the relay 11 of "normally open" contacts, that is to say open in the absence of electrical energization of this relay.

It will be recalled that it has been already proposed before the present invention to resort to a resistor-capacitor circuit to actuate the triggering of a circuit breaker sensitive to the establishment of a leakage current with a response time all the smaller as the intensity of the leakage current is greater. However with such a circuit the product of the response time and the intensity is substantially constant, which does not permit in practice the taking into account of all types of risks with respect to which protection is required: only independence between the various stages of the circuit according to the invention offers sufficient flexibility to ensure the universality of this protection.

As is self-evident, and as emerges already from the foregoing, the invention is in no way limited to those of its types of application and embodiments which have been more especially envisaged; it encompasses, on the contrary, all modifications.

We claim:

1. Circuit breaker for automatically cutting off the alternating current supply of an electrical receiver on the appearance of a leakage current between any point of this receiver and ground, said circuit breaker comprising a differential transformer for sensing the current flow in supply wires joining the receiver to an electrical supply source, said transformer being arranged so as to generate automatically in another conductor wire an electrical voltage $V_O$ when there is an unbalance between the current flowing in said supply wires, and means responsive to said voltage said voltage $V_O$ for automatically opening a switch connected to one at least of said supply wires after the amplitude of the voltage $V_O$ has reached at least a predetermined threshold, the abovesaid switch being constituted by the contact of a relay arranged to be open as long as said relay is not supplied electrically, said voltage responsive means being connected between the source and the switch, and comprising a circuit of n amplifiers connected in a series and supplied with said voltage $V_O$ after rectification thereof, n being an integer greater than 1, a number n of delay circuits supplied respectively by the output voltages from the n amplifiers, each delay circuit being adapted to produce, after each generation of a voltage signal $V_O$ starting at a moment $t_0$, a voltage pulse $U_i$ delay by a time delay $t_i$ with respect to $t_0$, only those pulses being produced which correspond to delays $t_i$ less than the actual duration of the signal $V_O$, means, with n inputs and one output, for receiving the pulses $U_i$ at the various inputs thereof and for generating a control signal at its output as soon as the amplitude of one of these pulses reaches or exceeds a predetermined threshold W, and electronic means connected to said output and arranged so as to cut off automatically the supply of the relay at the time a control signal is generated at said output.

2. Circuit breaker according to claim 1, comprising, in addition, resetting means for unblocking the electronic cutoff means after said cutoff means provides the abovesaid cutoff, said unblocking having the effect of enabling the electrical supply of the relay.

3. Circuit breaker according to claim 2, wherein said resetting means are actuatable manually.

4. Circuit breaker according to claim 2, wherein the resetting means are arranged so that they are actuated automatically after a few period $d_1$ subsequent to each cutoff of the supply of the relay, that this relay is again supplied for a second relatively short period $d_2$, and that at the end of this second period $d_2$ the supply of the relay is maintained or again cut off according to the disappearance or the persistance at this moment of the faulty voltage $V_O$.

5. Circuit breaker according to claim 4, wherein the resetting means comprise two monostable circuits in cascade, a D type flip-flop circuit connected to the output of the amplifier of order n and to the output of the second monostable circuit, and an OR gate connected to the output of the D type flip-flop circuit and to the output of the first monostable circuit.

6. Circuit breaker according to claim 4 or 5, wherein the resetting means are arranged so that the cycle of resetting and reblocking the electronic cutoff means are repeated at least once before arriving at a final cutoff in the case of persistance of the faulty voltage $V_O$.

7. Circuit breaker according to claim 4 or 5, wherein the periods $d_1$ and $d_2$ are respectively of the order of 100 ms and 30 ms.

8. Circuit breaker according to claim 4 or 5, wherein the resetting means are arranged so that the cycle of resetting and reblocking the electronic cutoff means are repeated at least once before arriving at a final cutoff in the case of persistance of the faulty voltage $V_O$, and wherein the periods $d_1$ and $d_2$ are respectively of the order of 100 ms and 30 ms.

9. Circuit breaker according to claim 4 or 5, wherein the time delay $t_1$ is greater than the duration of the initial large amplitude portion of the electrical disturbance, but less than the maximum admissible duration for the high intensity leakage currents, this time delay being preferably of the order of 10 to 20 ms.

10. Circuit breaker according to claim 4 or 5, wherein its components are selected so that the amplitude of the pulse produced by the time delay circuit of the highest rank n reaches a threshold W only when the intensity of the leakage current exceeds the maximum value $I_M$ that can be supported for a long period by a human body, the value of this intensity $I_M$ being preferably of the order of 1 mA.

11. Circuit breaker according to claim 4 or 5, wherein one at least of the delay circuits comprises, in series relation, a shunt circuit composed of a resistor and a capacitor connected in parallel with one another, a first inverter, a second resistor, a second shunt capacitor connected to the output side of the second resistor and a second inverter whose input is also connected to the output side of the second resistor.

* * * * *